United States Patent [19]

Kreutel, Jr.

[11] 4,087,818
[45] May 2, 1978

[54] LOSSLESS NETWORK AND METHOD FOR ORTHOGONALIZING DUAL POLARIZED TRANSMISSION SYSTEMS

[75] Inventor: Randall William Kreutel, Jr., Rockville, Md.

[73] Assignee: Communications Satellite Corporation, Washington, D.C.

[21] Appl. No.: 622,360

[22] Filed: Oct. 14, 1975

[51] Int. Cl.² .............................................. H04B 7/02
[52] U.S. Cl. ...................................... 343/176; 325/24; 343/100 PE
[58] Field of Search ............................ 325/56, 59, 60; 343/175, 176, 200, 100 PE, 100 AD, 100 CS

[56] References Cited
U.S. PATENT DOCUMENTS

| | | | |
|---|---|---|---|
| 3,146,447 | 8/1964 | Newman | 343/100 PE |
| 3,500,207 | 3/1970 | Ruthroff | 325/60 |
| 3,742,506 | 6/1973 | Wilkinson | 343/176 |
| 3,827,051 | 7/1974 | Foldes | 343/176 |
| 3,864,633 | 2/1975 | Strenglein | 325/56 |

*Primary Examiner* — Benedict V. Safourek

*Attorney, Agent, or Firm* — Sughrue, Rothwell, Mion, Zinn and Macpeak

[57] ABSTRACT

A technique is disclosed for restoring the orthogonality of dual polarized signals in frequency reuse communications systems. The technique may be characterized as polarization coding at the transmitter and polarization decoding at the receiver. Coding and decoding is accomplished solely by means of phase shifters and sum and difference networks which are lossless in the dissipative sense. The required phase shifts are determined by defining the transmission media in terms of a transmission matrix. All depolarization effects including those attributable to antennas, feeds and media are lumped into this matrix. The transmission matrix may be determined empirically, and the phase shifts fixed for a given transmission media. Where the characteristics of the transmission media vary with time due to atmospheric and other effects as is the usual case, an automatic, closed loop orthogonalization network is employed wherein a pilot signal is generated at one or both ends of the communications system and used to derive error signals for phase shifter control. The technique disclosed is applicable to systems using either linearly or circularly polarized waves.

8 Claims, 7 Drawing Figures

FIG. 5

| | TYPE OF DEPOLARIZATION | TRANSMISSION MATRIX | CIRCUIT PARAMETERS |
|---|---|---|---|
| (a) | $X_1, E_1, \theta, E_2, \theta, X_2$ | $[T] = \begin{bmatrix} \cos\theta & \sin\theta \\ \sin\theta & \cos\theta \end{bmatrix}$ | $\psi = \beta = 0$ |
| (b) | | $[T] = \begin{bmatrix} 1 & jB \\ jB & 1 \end{bmatrix}$ | $\psi = \beta = 0$ |
| (c) | | $[T] = \begin{bmatrix} 1 & jB \\ -jB & 1 \end{bmatrix}$ | $\psi = 90°$ $\beta = 0$ |
| (d) | | $[T] = \begin{bmatrix} Ae^{j\alpha} & Be^{-j\gamma} \\ Be^{-j\gamma} & Ae^{j\alpha} \end{bmatrix}$ | $\psi = \beta = 0$ |
| (e) | | $[T] = \begin{bmatrix} Ae^{-j\alpha} & Be^{-j\gamma} \\ Be^{j\gamma} & Ae^{j\alpha} \end{bmatrix}$ | $\psi = -(\gamma+\alpha)$ $\beta = 2\alpha$ |

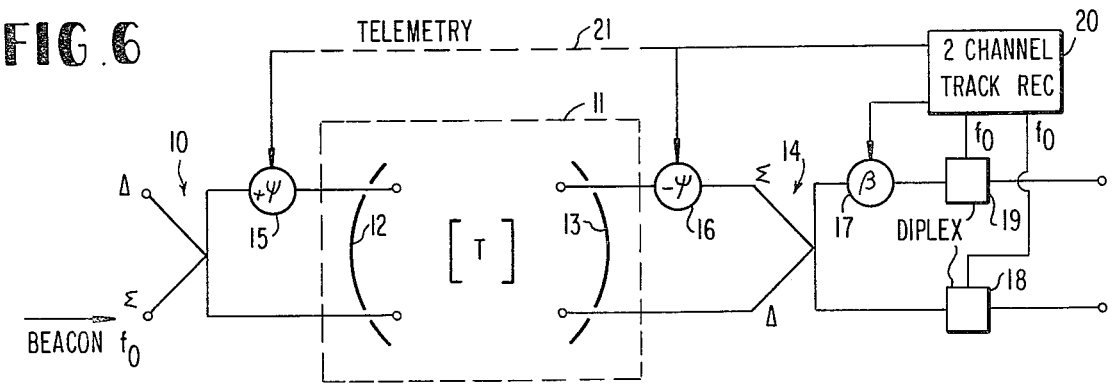

FIG. 6

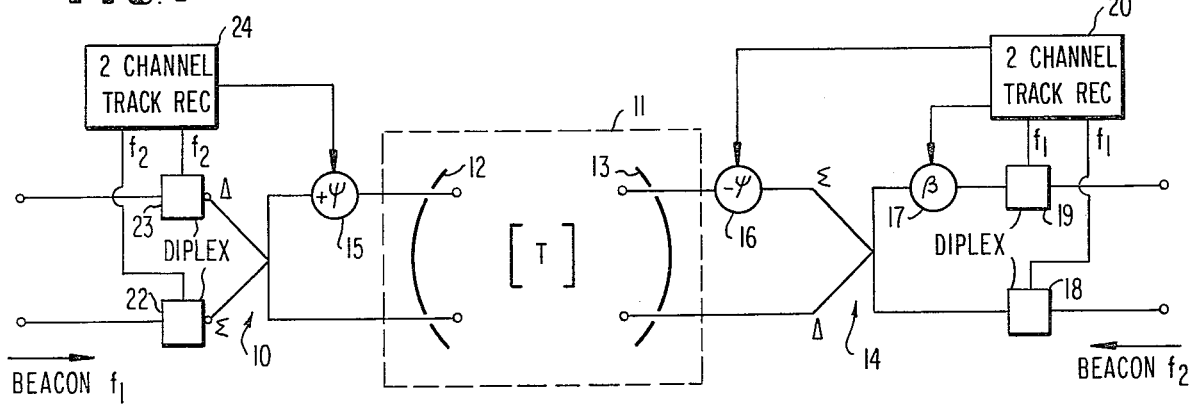

FIG. 7

LOSSLESS NETWORK AND METHOD FOR ORTHOGONALIZING DUAL POLARIZED TRANSMISSION SYSTEMS

BACKGROUND OF THE INVENTION

1. Field of the Invention

The present invention generally relates to communications systems and, more particularly, to a technique for orthogonalizing transmission systems which reuse frequency on dual polarizations.

2. Description of the Prior Art

Using two orthogonal polarizations simultaneously effectively doubles the bandwidth of a communications system. Systems using this technique are referred to as frequency reuse systems and are of particular interest in communications satellite systems. However, due to the polarization characteristics of the spacecraft antenna and the earth station antenna such as non-ideal feed axial ratio, antenna depolarization, and the like, there exists a certain amount of "static" cross-coupling of signals. In addition, such factors as Faraday rotation, spacecraft orientation and depolarization of signals due to rainfall and other atmospheric effects, there is a rather large coupling of signals which is "dynamic" (i.e., time-varying) in nature. Both static and dynamic cross-polarization interference act to seriously degrade the performance of frequency reuse systems.

It has been suggested by T.S. Chu, "Restoring the Orthogonality of Two Polarizatons in Radio Communications Systems, I," *The Bell System Technical Journal*, Vol. 50, No. 9, November 1971, at pages 3063 to 3069, that by using a differential phase shifter and a differential attenuator, the orthogonality can be recovered by the transformation of two nonorthogonal elliptically polarized waves into two orthogonal polarizations. The system proposed by T. S. Chu is implemented with a lossy compensating network at only the transmitting or receiving end of the transmission link and not at both. In fact, it can be shown that, in general, orthogonalization networks inserted in the system at either the transmitting or receiving end, but not both, will be lossy.

SUMMARY OF THE INVENTION

The invention pertains to a technique for orthogonalizing waves in a dual polarized transmission system by the inclusion of simple, lossless networks at both the transmitting and receiving ends of the system. The resulting system is invulnerable to the most common types of depolarization which can occur in a transmission system. By using networks at both ends of the transmission link, the disadvantages of the prior art are effectively overcome. The technique may be characterized as polarization coding at the transmitter and polarization decoding at the receiver. Coding and decoding is accomplished solely by means of phase shifters and sum and difference networks which are lossless in the dissipative sense. The required phase shifts are determined by defining the transmission media in terms of a transmission matrix. All depolarization effects including those attributable to antennas, feeds and media are lumped into this matrix. The transmission matrix may be determined empirically, and the phase shifts fixed for a given static transmission media. To compensate for a transmission media with dynamic characteristics, an automatic, closed loop orthogonalization network is employed wherein a pilot signal is generated at one or both ends of the communications system and used to drive error signals for phase shifter control.

BRIEF DESCRIPTION OF THE DRAWINGS

The specific nature of the invention, as well as other objects, aspects, uses, and advantages thereof, will clearly appear from the following description and from the accompanying drawings, in which:

FIG. 5 is a tabular illustration of the types of depolarization which can be orthogonalized according to the invention;

FIG. 6 is a schematic diagram of an automatic, closed loop orthogonalization network for one way transmission; and FIG. 7 is a schematic diagram of an automatic, closed loop orthogonalization network for two way transmission.

DESCRIPTION OF THE PREFERRED EMBODIMENTS

Figure 1:
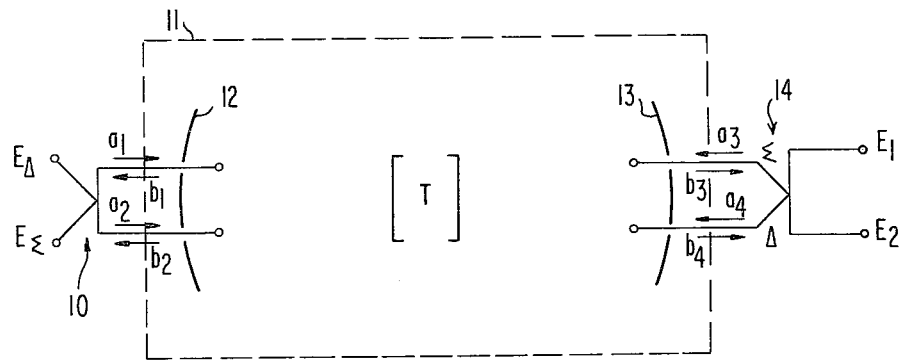
FIG. 1 is a schematic diagram of an orthogonalized transmission system wherein the transmission matrix is assumed to be symmetric.

At the outset, it will be understood by those skilled in the art that the invention is applicable to a system which uses either linearly or circularly polarized waves; however, the examples given hereinafter are, for clarity, based on a linearly polarized system.

The problems which the present invention solves is first defined mathematically, and then specific solutions are derived. Network realizations of the specific solutions are used to develop a generalized form of orthogonalized dual polarized transmission network. This generalized network forms the basis of two possible closed loop systems for automatic orthogonalization.

A set of independent voltages, $x_1$ and $x_2$ are taken as the driving voltages for the orthogonally polarized antenna ports at the sending end of the transmission system. A corresponding set of voltages, $y_1$ and 2, are generated at the receiving end of the system. In the ideal system the $x_1$ voltage depends only on $y_1$ and the $x_2$ voltage only on $y_2$. In a practical system, however, cross-coupling occurs as a consequence of antenna imperfections, aperture blockage and the propagation medium. In the present analysis all of these effects are lumped together into a matrix formulation. Thus, $$\begin{bmatrix} y_1 \\ y_2 \end{bmatrix} = \begin{bmatrix} T_{11} & T_{12} \\ T_{21} & T_{22} \end{bmatrix} \begin{bmatrix} x_1 \\ x_2 \end{bmatrix} \quad (1)$$

is a mathematical statement of the transmission where the off-diagonal terms include all cross-coupling effects. It follows that the orthogonalization problem can be stated as follows: Networks must be inserted in the transmission system which operate on the T matrix in equation (1) such that the resulting transformed matrix contains only diagonal terms. Then the transmission given by equation (1) should approach that of the ideal system.

The diagonalization of a square operator matrix such as the T matrix in equation (1) is a classical problem in applied mathematics. Solutions will now be derived for three cases of particular importance. These are as follows: (1) when the T matrix is symmetric, (2) when the T matrix is Hermitian, and (3) when the T matrix is real, asymmetric.

A symmetric T matrix corresponds to the case when $T_{21} = T_{12}$. We further make the very reasonable assumption that $T_{11} = T_{22}$. The coupling corresponding to this type of matrix is, for example, that which exists between a pair of linearly polarized fields which are not spacially perpendicular. For this case equation (1) becomes:

$$\begin{bmatrix} y_1 \\ y_2 \end{bmatrix} = \begin{bmatrix} T_{11} & T_{12} \\ T_{12} & T_{11} \end{bmatrix} \begin{bmatrix} x_1 \\ x_2 \end{bmatrix} \quad (2)$$

The T matrix in equation (2) can be diagonalized by an orthogonal transform of the form:

$$Q^t T Q = T_D \quad (3)$$

where the $t$ superscript denotes the transpose and $T_D$ is the diagonalized form of T.

For a transform of the type represented by equation (3), the diagonal elements of $T_D$ are simply the eigenvalues of T. Further, the Q matrix is composed of columns each of which is a corresponding eigenvector. These quantities are easily found for the matrix in equation (2) and upon substitution of equation (3) in equation (2) we obtain:

$$\begin{bmatrix} y_1 \\ y_2 \end{bmatrix} = \begin{bmatrix} \frac{1}{\sqrt{2}} & -\frac{1}{\sqrt{2}} \\ \frac{1}{\sqrt{2}} & \frac{1}{\sqrt{2}} \end{bmatrix} \begin{bmatrix} T_{11} & T_{12} \\ T_{12} & T_{11} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} x_1 \\ x_2 \end{bmatrix} \quad (4)$$

$$= \begin{bmatrix} T_{11} - T_{12} & 0 \\ 0 & T_{11} + T_{12} \end{bmatrix} \begin{bmatrix} x_1 \\ x_2 \end{bmatrix}$$

Equation (4) obviously represents a solution to the problem stated earlier, i.e., $y_1$ is a function of $x_1$ alone and $y_2$ is a function of $x_2$ alone, and these relations hold independent of $T_{12}$. However, a differential channel gain $\Delta G$ is noted of magnitude:

$$\Delta G = \frac{|T_{11} + T_{12}|}{|T_{11} - T_{12}|} \quad (5)$$

Perhaps the most notable feature of equation (4) is the remarkable simplicity of the pre- and post-multiplying matrices involved in the transformation and further that they are identifiable with equally simple network realizations, e.g., sum and difference hybrids, and these networks are independent of the amount of cross-coupling present in T. The implication is that simply inserting sum and difference hybrids at the sending and receiving ends of the system orthogonalizes the fields. A schematic representation of the network realization of equation (4) is shown in FIG. 1.

In FIG. 1, the sending or transmitting end includes a sum and difference hybrid 10, which can be of any well-known type such as a Magic "T" or a microstrip circulator. The sum arm of the hybrid is designated by a $\Sigma$ and the difference arm of the hybrid is designated by a $\Delta$. The inputs of the hybrid 10 are $E_\Delta$ and $E_{93}$ which correspond to voltges $x_1$ and $x_2$, respectively, in equation (4). The outputs of hybrid 10 are connected to a transmission media 11 which includes transmitting antenna 12 and receiving antenna 13. More specifically, the outputs of hybrid 10 are connected to respective horn feeds of antenna 12, and these horn feeds produce polarized radiations which are orthogonal with respect to one another. The transmission media 11 is defined by the matrix T, and all depolarization effects including antennas 12 and 13, the media and a satellite transponder (if required) are assumed to be lumped in this matrix. The receiving end also includes a sum and difference hybrid 14 which is connected to the horn feeds of receiving antenna 13, and these horn feeds are responsive to orthogonally polarized radiations. The outputs of hybrid 14 are $E_1$ and $E_2$ which correspond to voltages $y_1$ and $y_2$, respectively.

Figure 2:
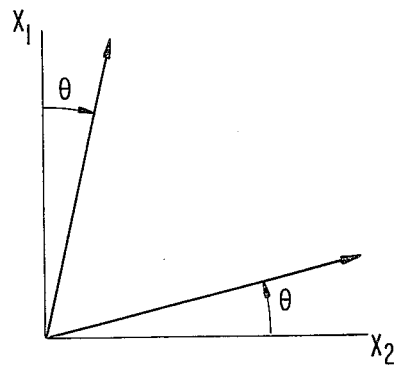
FIG. 2 is a graphical illustration of an example of feed coupling in the case of a symmetric transmission matrix.

Equation (4) can be identified with the important physical problem depicted in FIG. 2. Here we have two linearly polarized fields which are not spacially perpendicular but which are symmetrically disposed about a set of orthogonal axes (say the $x_1 - x_2$ axes). For this case $T_{11} = \cos \phi$ and $T_{12} = \sin \phi$ and equation (4) becomes:

$$\begin{bmatrix} y_1 \\ y_2 \end{bmatrix} = \begin{bmatrix} \cos \theta - \sin \theta & 0 \\ 0 & \cos \theta + \sin \theta \end{bmatrix} \begin{bmatrix} x_1 \\ x_2 \end{bmatrix} \quad (6)$$

and the differential gain is:

$$\Delta G = \frac{\cos \theta + \sin \theta}{\cos \theta - \sin \theta} = \tan(\theta + 45°) \quad (7)$$

Equation (7) is identical to the result derived by T. S. Chu in the above-mentioned BSTJ article, although in this case it is not due to dissipative attenuation. The network realization of equation (4) is lossless, and one would not expect dissipative attenuation in either transmission path.

It should be noted that equation (4) is not restricted to the case where the matrix terms are real. It is valid for arbitrary complex values of the matrix coefficients. In particular, it is valid for the important case of a nominally linearly polarized system but in which the fields are elliptically polarized with opposite screw senses. For this important case, the coupling terms are nominally in-phase quadrature with the principal diagonal terms and the differential gain approaches zero.

The Hermitian T matrix is defined by $T_{12} = T_{21}^*$ and real principal diagonal terms. Thus:

$$\begin{bmatrix} y_1 \\ y_2 \end{bmatrix} = \begin{bmatrix} T_{11} & T_{12}^* \\ T_{12} & T_{11} \end{bmatrix} \begin{bmatrix} x_1 \\ x_2 \end{bmatrix} \quad (8)$$

A matrix of the type given in equation (8) can be diagonalized by means of a unitary transformation of the type:

$$Q^t T Q = T_D \quad (9)$$

where as before $T_D$ is the equivalent diagonal form of T in which the diagonal elements are the eigenvalues of T. The Q matrix is comprised of columns which are the corresponding eigenvectors. These quantities are easily determined with the result:

$$\begin{bmatrix} y_1 \\ y_2 \end{bmatrix} = \begin{bmatrix} \frac{e^{j\psi}}{\sqrt{2}} & -\frac{1}{\sqrt{2}} \\ \frac{e^{j\psi}}{\sqrt{2}} & \frac{1}{\sqrt{2}} \end{bmatrix} \begin{bmatrix} T_{11} & T_{12}^* \\ T_{12} & T_{11} \end{bmatrix} \begin{bmatrix} \frac{e^{-j\psi}}{\sqrt{2}} & \frac{e^{-j\psi}}{\sqrt{2}} \\ -\frac{1}{\sqrt{2}} & \frac{1}{\sqrt{2}} \end{bmatrix} \begin{bmatrix} x_1 \\ x_2 \end{bmatrix} \quad (10)$$

$$= \begin{bmatrix} T_{11} - |T_{12}| & 0 \\ 0 & T_{11} + |T_{12}| \end{bmatrix} \begin{bmatrix} x_1 \\ x_2 \end{bmatrix}$$

where $e^{j\psi} = T_{12}/|T_{12}|$. It is evident that when $\Psi = 0$, equation (10) reduces to a special case of equation (4), i.e., that for which $T_{12}$ is real.

It is evident that the operation indicated in (10) has isolated the two transmission channels with the apparent penalty of a differential channel gain. These operations are easily identified with network forms, and again they are sum and difference hybrids, but in this case, a phase shifter is required with both networks, the value of which depends on the phase of $T_{12}$. A schematic representation of the network defined by (10) is shown in FIG. 3.

Figure 3:
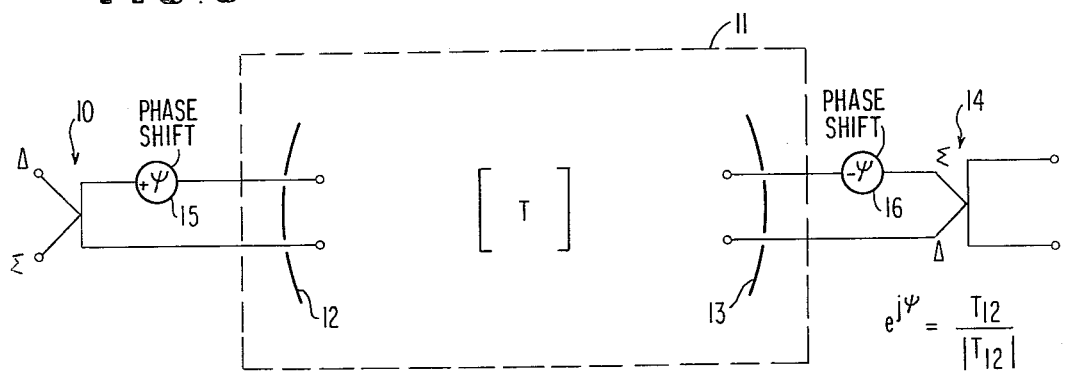
FIG. 3 is a schematic diagram of an orthogonalized transmission system wherein the transmission matrix is assumed to be Hermitian.

As shown in FIG. 3, the outputs of the sending end hybrid 10 are connected to the horn feeds of transmitting antenna 12 as in FIG. 1, but with a phase shifter 15 inserted in the connection between one of the outputs of hybrid 10 and its corresonding horn feed. In like manner at the receiving end, a phase shifter 16 is inserted between one of the horn feeds of receiving antenna and the corresponding input to hybrid 14.

It is evident that the main difference between the networks which diagonalize a symmetric matrix and those which diagonalize an Hermitian matrix is that the former are independent of $T_{12}$ while the latter depend on the phase of $T_{12}$. Also, the diagonalized Hermitian form inherently results in differential channel gain while the diagonalized symmetric form does not necessarily.

An important example of the Hermitian T matrix is the case in which the system is nominally linearly polarized but the fields are actually elliptically polarized of the same screw sense.

We will now consider a T matrix in which $T_{12} = -T_{21}$ and $T_{12}$ is real. This case is of interest because it characterizes the Faraday rotation of a pair of orthogonal linear fields ($T_{11} = T_{22} = \cos\phi$, $T_{12} = \sin\phi$, $-T_{12} = \sin\phi$, where $\theta$ is the rotation angle). Equation (1) can be written:

$$\begin{bmatrix} y_1 \\ y_2 \end{bmatrix} = \begin{bmatrix} T_{11} & -T_{12} \\ T_{12} & T_{11} \end{bmatrix} \begin{bmatrix} x_1 \\ x_2 \end{bmatrix} \quad (11)$$

The appropriate diagonalizing transformation for the T matrix in (11) is:

$$Q^{-1} T Q = T_D \quad (12)$$

where, as in previous examples, the $T_D$ and $Q$ matrices are given in terms of the eigenvalues and eigenvectors of T respectively. The transformation (12) is not, in general, orthogonal for asymmetric T, but for this special case it turns out to be. Performing the indicated operations in the transformed equation (1):

$$\begin{bmatrix} y_1 \\ y_2 \end{bmatrix} = \begin{bmatrix} \frac{1}{\sqrt{2}} & \frac{j}{\sqrt{2}} \\ \frac{j}{\sqrt{2}} & \frac{1}{\sqrt{2}} \end{bmatrix} \begin{bmatrix} T_{11} & -T_{12} \\ T_{12} & T_{11} \end{bmatrix} \begin{bmatrix} \frac{1}{\sqrt{2}} & \frac{-j}{\sqrt{2}} \\ \frac{-j}{\sqrt{2}} & \frac{1}{\sqrt{2}} \end{bmatrix} \begin{bmatrix} x_1 \\ x_2 \end{bmatrix} \quad (13)$$

$$= \begin{bmatrix} T_{11} + jT_{12} & 0 \\ 0 & T_{11} - jT_{12} \end{bmatrix} \begin{bmatrix} x_1 \\ x_2 \end{bmatrix}$$

Equation (13) is a result which might have been anticipated. The pre- and post-multipliers are easily identified as 3 dB quadrature hybrids, and so in effect we have simply converted out linearly polarized system to a circularly polarized system which, of course, is not susceptible to Faraday rotation. This is further verified by noting that the differential channel gain is zero but that there is always differential channel phase, and it is precisely this characteristic wave differential phase which gives rise to Faraday rotation. In other words, the transformation (13) simply converts the linearly polarized field rotation into the equivalent characteristic wave phase delay.

The present example is not of special importance because it provides no new information but it is useful in providing some physical understanding of the transformation process. For non-zero $T_{12}$, the fields are not orthogonal in the T domain (the real world). The postmultiplier (the sending end of the network) simply transforms the fields into a new domain in which the transmission fields are orthogonal, and finally, the premultiplier (the receiving end network) transforms the fields back into the original domain.

Figure 4:
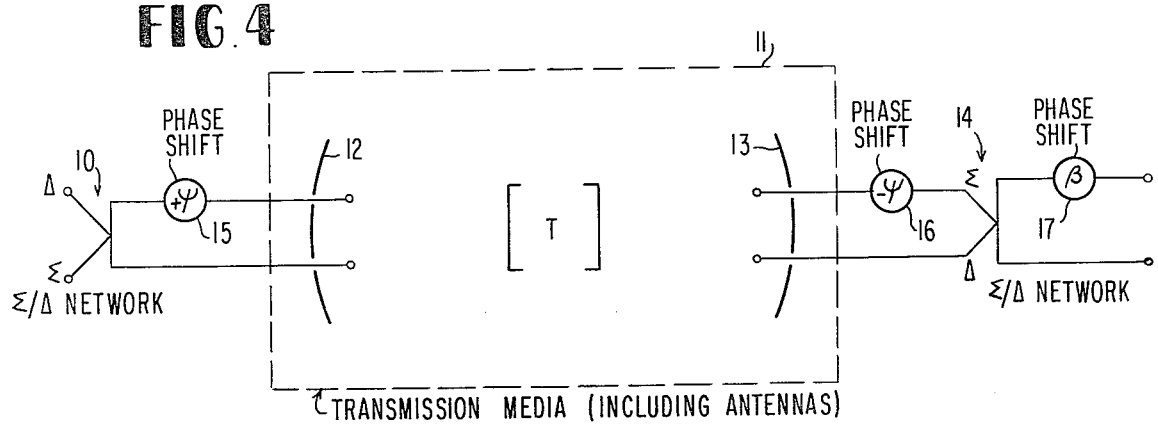
FIG. 4 is a schematic diagram of a generalized form of orthogonalized dual polarized transmission network.

We can now consider the most general form of the transmission system which is shown in FIG. 4. This system is identical to that shown in FIG. 3 but with the addition of a third phase shifter 17 in one of the outputs of receiving hybrid 14. The phase shift produced by phase shifter 17 is designated $\beta$ to distinguish it from the phase shifts produced by phase shifters 15 and 16. The types of depolarization which can be completely compensated by the system of FIG. 4 are shown in FIG. 5. Also illustrated in FIG. 5 is the relationship between the types of depolarization and the circuit parameters of FIG. 4. It is readily apparent from FIG. 5 that the most common types of depolarization can be orthogonalized using this invention. It should be noted, however, that the lossless circuit modifications to the transmission system provide perfect orthogonalization only if the ellipticity (axial ratio) of the two depolarized fields are identical. For example, for the cases illustrated in rows (b) and (c) of FIG. 5, if one axial ratio is 30 dB and the other is 29 dB, the carrier-to-interference ratio is approximately 55 dB on both channels, whereas if the axial ratios were equal, the C/I would be $\infty$ dB. Similar statements apply to all the other cases illustrated in FIG. 5.

It will be noted in the derivations presented above that for some instances power is not conserved at the terminals of the transmission system. This can be attributed to the nature of the transmission matrix. For a lossless transmission media the transmission matrix should be unitary if terminal power is to be conserved. It can easily be shown that an Hermitian matrix cannot be unitary. Consequently, transmission characterized by an Hermitian matrix will not conserve terminal power. This is evidenced in the form of equation (10) in which it is clear that power is lost (for example set $x_2 = 0$). Further, the symmetric matrix is unitary only for the special case where $T_{12}$ has quadrature phase. Thus, the example cited by equation (6) does not conserve power.

We can interpret the power conservation criteria indicated above in terms of the type of wave transformations characteristic of the T matrix. If the T matrix transforms the orthogonal input waves into a new set of orthogonal waves (as in the case for the symmetric matrix with quadrature $T_{12}$) then transmission power is conserved. If this is not the case, as for example, for Hermitian transmission, power will be lost. Further, it would appear that the power lost is precisely that which is cross-coupled as a consequence of non-orthogonality.

Since it has been postulated that the transmission media (including antennas and feed) is lossless and power is lost, then it follows that the lost power must be either scattered or reflected. This being the case, the two by two transmission matrix does not adequately define the network. We must revert to a complete four by four matrix representation of the network in which reflection coefficients, which are calculated to make the matrix unitary, are included.

It should be noted that the limitations imposed by the use of the reduced (2 × 2) transmission matrix do not substantially detract from the value of the present analysis. The results are still mathematically correct. The only thing it does not provide is the appropriate scale factor for transmission and a knowledge of how the power lost is distributed in the system.

The special case of importance is the one depicted in FIG. 2 in which we have two linearly polarized fields which are not spacially perpendicular but which are symmetrically disposed about the $x_1 - x_2$ axes. For the present purpose we take the model of transmission to be completely enclosed and lossless so that terminal power is conserved. That is, the possibility of spacial scattering of energy is precluded. For this model the matrix representation of the network must be unitary.

For convenience we change from the transmission matrix notation to scattering matrix notation. The transmission media is, thus, defined by a matrix of the form:

$$[S] = \begin{bmatrix} b & c & | & a\cos\theta & a\sin\theta \\ c & b & | & a\sin\theta & a\cos\theta \\ \hline a\cos\theta & a\sin\theta & | & b & c \\ a\sin\theta & a\cos\theta & | & c & b \end{bmatrix} \quad (14)$$

where $a$, $b$, and $c$ are terms to be determined. It will be noted the upper right and lower left sub-matrices (as indicated by the partitioning) are of the same form as the T matrix.

As indicated earlier the matrix (14) must be unitary. Mathematically stated:

$$S^{t*} S = I \quad (15)$$

where $t$ and $*$ denote transpose and conjugate, respectively, and I is the unit matrix. Equation (15) gives a set of equation which can be solved for $a$, $b$ and $c$. Performing this operation gives:

$$a = \frac{1}{\sqrt{1 + \sin 2\theta}} \quad (16)$$

$$b = j\frac{1}{\sqrt{2}} \sqrt{\frac{\sin 2\theta}{1 + \sin 2\theta}}$$

$$c = -j\frac{1}{\sqrt{2}} \sqrt{\frac{\sin 2\theta}{1 + \sin 2\theta}}$$

Substituting equation (16) in equation (14) we obtain:

$$[S] = \frac{1}{\sqrt{1 + \sin 2\theta}} \begin{bmatrix} j\sqrt{\frac{\sin 2\theta}{2}} & -j\sqrt{\frac{\sin 2\theta}{2}} & | & \cos\theta & \sin\theta \\ -j\sqrt{\frac{\sin 2\theta}{2}} & j\sqrt{\frac{\sin 2\theta}{2}} & | & \sin\theta & \cos\theta \\ \hline \cos\theta & \sin\theta & | & j\sqrt{\frac{\sin 2\theta}{2}} & -j\sqrt{\frac{\sin 2\theta}{2}} \\ \sin\theta & \cos\theta & | & -j\sqrt{\frac{\sin 2\theta}{2}} & j\sqrt{\frac{\sin 2\theta}{2}} \end{bmatrix} \quad (17)$$

The terminal behavior of the transmission domain is given by the matrix equation:

$$\bar{b} = S \cdot \bar{a} \quad (18)$$

where S is given by equation (17) and $a$ and $b$ are column vectors describing the input and output terminal waves. The orthogonalized network includes sum and difference hybrids at both ends as shown in FIG. 1 where the T matrix is assumed to be replaced by the S matrix. In FIG. 1, the $a_n$'s and $b_n$'s are the elements of the column vectors in equation (18). The sending end voltages are $E_1$ and $E_2$ which can have arbitrary, complex values. Assuming the hybrids are ideal, we have for the column vectors in equation (18):

$$\bar{a} = \begin{bmatrix} 0 \\ 0 \\ \frac{1}{\sqrt{2}}(E_1 + E_2) \\ \frac{1}{\sqrt{2}}(E_2 - E_1) \end{bmatrix} \quad ; \quad \bar{b} = \begin{bmatrix} b_1 \\ b_2 \\ b_3 \\ b_4 \end{bmatrix} \quad (19)$$

Inserting equation (19) in equation (18) and performing the indicated operation gives:

$$b_1 = \frac{1}{\sqrt{2}} \frac{1}{\sqrt{1 + \sin 2\theta}} [(E_1 + E_2)\cos\theta + (E_2 - E_1)\sin\theta] \quad (20)$$

$$b_2 = \frac{1}{\sqrt{2}} \frac{1}{\sqrt{1 + \sin 2\theta}} [(E_1 + E_2)\sin\theta + (E_2 - E_1)\cos\theta]$$

$$b_3 = j\sqrt{\frac{\sin 2\theta}{1 + \sin 2\theta}} E_1$$

-continued $$b_4 = j\sqrt{\frac{\sin 2\theta}{1 + \sin 2\theta}} \, E_1$$

Finally, the waves $b_1$ and $b_2$ are summed and differenced to give:

$$E_\Sigma = \frac{\cos\theta + \sin\theta}{\sqrt{1 + \sin 2\theta}} E_2 = E_2 \quad (21)$$
$$E_\Delta = \frac{\cos\theta - \sin\theta}{\sqrt{1 + \sin 2\theta}} E_1 = E_1 \tan(45° - \theta)$$

The differential gain is given by:

$$\Delta G = \frac{E_\Sigma/E_2}{E_\Delta/E_1} = \frac{1}{\tan(45° - \theta)} = \tan(\theta + 45°) \quad (22)$$

which is in agreement with equation (7). However, it is now clear that the differential gain is a consequence of gain loss in one channel, namely the $E_\Delta/E_1$ channel.

The reflected fields are given by the sum and difference processing of the sending end hybrid. The reflected field at the $E_2$ port is zero, while the reflected field at the $E_1$ port is given by:

$$\Gamma E_1 = \sqrt{\frac{2 \sin 2\theta}{1 + \sin 2\theta}} \, E_1 \quad (23)$$

Thus, we have the interesting result that $E_\Sigma/E_2$ transmission path is 100% efficient following orthogonalization, whereas the $E_\Delta/E_1$ transmission is impaired by reflection loss. However, for all cases ($\phi \neq 45°$) the carrier-to-interference ratio is increased from the $\cos\phi$ to $\infty$ in both transmission paths. Further, this analysis can be taken as proof that orthogonalization can be accomplished by means of the sum and difference networks without dissipative attentuation (which was not the case in Chu's BSTJ paper).

Finally, to demonstrate that terminal power is indeed conserved we use equations (21) and (23):

$$P_{out} = \frac{1}{2}\left|E_\Sigma\right|^2 + \frac{1}{2}\left|E_\Delta\right|^2 + \frac{1}{2}\left|\Gamma E_1\right|^2 \quad (24)$$
$$= \frac{1}{2}\left|E_2\right|^2 + \frac{1}{2}\left(\frac{1 - \sin 2\theta}{1 + \sin 2\theta}\right)\left|E_1\right|^2 + \frac{\sin 2\theta}{1 + \sin 2\theta}\left|E_1\right|^2$$
$$= \frac{1}{2}\left|E_2\right|^2 + \frac{1}{2}\left|E_1\right|^2$$

which is, of course, the power input to the system.

Up to this point, it has been assumed that the transmission matrix T is known and nonvarying with time. For example, in order to determine which matrix T defines the transmission media, the type of depolarization could first be determined by transmission without compensation. Once the type of depolarization produced by a particular transmission media is known, the proper matrix T may be determined by reference to FIG. 5. However, in satellite communications depolarization effects are always time variable. In a practical system, therefore, it is necessary to provide a way to automatically adjust the circuit parameters of the system shown in FIG. 4 as the depolarization effects of the transmission media change.

In FIG. 6, an automatic, closed loop orthogonalization system for one way transmission is shown. A narrow band beacon signal $f_o$ having a frequency within the pass band of the system is generated by a beacon oscillator (not shown) at the transmitting end and supplied to one port, say the sum port, of hybrid 10. The beacon signal $f_o$ may be either continuous or periodic, but in either case should be capable of being filtered out at the receiving end. More particularly, diplexers 18 and 19 are included in the outputs of receiving hybrid 14 and supply the detected beacon signal $f_o$ to a two channel tracking receiver 20. As is well known to those skilled in the communications and radar arts, the function of the receiver 20 is to develop error voltages. These error voltages are then used to adjust the phase shifts of phase shifters 15, 16 and 17. In the case of phase shifter 15, however, some form of telemetry 21, either land line or radio link, is required.

The automatic, closed loop orthogonalization system shown in FIG. 6 can be expanded for two way transmission as shown in FIG. 7. In this case, two narrow band beacons $f_1$ and $f_2$ are used. The beacon signal $f_1$ is generated by a beacon oscillator (not shown) on the left side of the transmission system and detected by filtering on the rightside. In this respect, the system shown in FIG. 7 is identical to that shown in FIG. 6 for one way transmission. The beacon signal $f_2$ is generated by a beacon oscillator (also not shown) on the right side of the transmission system and detected on the left side in an analogous manner. More particularly, diplexers 22 and 23 are connected to the sum and difference ports, respectively, of hybrid 10. The diplexers 22 and 23 supply the detected beacon signal $f_2$ to a two channel tracking receiver 24 which generates an error voltage to adjust the phase shift of phase shifter 15, the phase shifts of phase shifters 16 and 17 being adjusted by the error voltages from receiver 20.

Complete system orthogonalization by the networks of this invention is possible, for linearly polarized systems, only if the output ports of the receiving antennas are symmetricized with respect to the depolarized fields. This can be accomplished by physically rotating the antenna or a portion thereof. The beacon signals can also be used to drive a control system for automatically accomplishing this rotation. In a system where Faraday rotation is present, this type of alignment is essential. Actual physical rotation and subsequent orthogonalization is one solution to this problem.

An alternative solution where dynamic field rotation is a problem, e.g., Faraday effect, the system should be designed to be nominally dual circularly polarized. For reasonably small axial ratios, the dual circularly polarized system is relatively immune to the Faraday effects typically observed at microwave frequencies. The circular polarization need not be perfect. In fact, the use of the networks according to the invention greatly relax the design requirements imposed on the transmission system. For example, the type of depolarization characteristic of differential phase error in a quarter wave plate is typified by that which is shown in row (d) of FIG. 5. For this case, the orthogonalizing network is identical to that shown in FIG. 1.

Referring back to equation (4) it should be noted that the operating matrices which diagonalize the symmetric transmission matrix can be identified as coordinate rotators as well as sum and difference hybrids. The pre-multiplier represents a $-45°$ rotation and the post-multiplier a $45°$ rotation. Recognizing this dual identity provides additional freedom in circuit simplifications. A system characterized by a transmission matrix as given in equation (4) can be orthogonalized simply by rotating the ortho-mode transducer (OMT) at each end of the system. An excellent example of this is the square horn. The square horn when operated in the $TE_{10}$ and $TE_{01}$ modes provides relatively poor polarization isolation. However, when fed across the diagonals (a simple 45° rotation of the driving fields) the polarization isolation is substantially improved. Further, the dual identity of the matrices can be used to advantage in "forcing" the transmission behavior to the type defined by equation (4). For example, a sum and difference circuit with a phase shifter and attenuator in one arm coupled to an OMT can always be designed to make $T_{11} = T_{22}$. This is done at one end of the system. At the other end a simple 45° rotation of the OMT is all that is required. This type of simplification, however, can only be accomplished for the symmetric type transmission.

The advantages of this invention can be stated as follows:
1. It is always possible to, in principle, completely orthogonalize a dual polarized transmission system.
2. For some special (but very important) cases — namely, when the transmission matrix is either symmetric or Hermitian — orthogonalization can be achieved by means of simple lossless networks.
3. If the transmission matrix is unitary (in its 2 × 2 form) then all the power is recovered through orthogonalization; if not, then transmission power is lost and this power is equal to the power associated with cross coupling in the transmission domain.

What is claimed is:

1. In a dual polarization transmission system including transmitting means for transmitting two signals having the same frequency but orthogonal polarizations and receiving means for receiving said two signals, a lossless network for orthogonalizing the received signals comprising first sum and difference hybrid means in said transmitting means for polarization coding said signals prior to transmission and second sum and difference hydrid means in said receiving means for polarization decoding said signals after reception.

2. In a dual polarization transmission system as recited in claim 1, wherein said transmitting means includes a transmitting antenna with two horn feeds, said first hybrid means having four ports two of which are connected to receive said two signals to be transmitted and the other two of which are connected to the two horn feeds of said transmitting antenna, said receiving means includes a receiving antenna with two horn feeds, said second hybrid means having four ports two of which are connected to the two horn feeds of said receiving antenna and the other two of which provide decoded output signals.

3. In a dual polarization transmission system as recited in claim 2, said lossless network for orthogonalizing further comprising a first phase shift means connected between one port of said first hybrid means and one horn feed of said first transmitting antenna, and second phase shift means connected between one horn feed of said receiving antenna and one port of said second hybrid means.

4. In a dual polarization transmission system as recited in claim 3, said lossless network for orthogonalizing further comprising a third phase shift means connected to one of the ports of said second hybrid means providing decoded output signals.

5. In a dual polarization transmission system as recited in claim 4, wherein each of said first, second and third phase shift means are variable.

6. In a dual polarization transmission system as recited in claim 5, further comprising means connected to the output ports of said second hybrid means for automatically adjusting the phase shifts of said first, second and third phase shift means to maintain the orthogonality of said two polarized signals.

7. In a dual polarization transmission system as recited in claim 6, wherein said means for automatically adjusting the phase shifts includes first and second diplexers connected to the output ports of said second hybrid means, and tracking receiver means connected to said first and second diplexers and responsive to a narrow band beacon signal generated at said transmitting means for producing error voltages to adjust said phase shifts.

8. In a dual polarization transmission system as recited in claim 7, wherein said transmission system is a two way transmission system and said tracking receiver means produces error voltages to adjust the phase shifts of said second and third variable phase shift means, further including third and fourth diplexers connected to the ports of said first hybrid means opposite to said transmitting antenna, and a second tracking receiver means connected to said third and fourth diplexers and responsive to a narrow band beacon signal generated at said receiving means for producing an error voltage to adjust the phase shift of said first variable phase shift means.

* * * * *

UNITED STATES PATENT AND TRADEMARK OFFICE
CERTIFICATE OF CORRECTION

PATENT NO. : 4,087,818                         Page 1 of 2
DATED : May 2, 1978
INVENTOR(S) : Randall William KREUTEL, Jr.

It is certified that error appears in the above-identified patent and that said Letters Patent are hereby corrected as shown below:

IN THE SPECIFICATION:

Column 2, line 47 - delete "2" insert -- $y_2$ --

Column 4, line 1 - delete "$E_{93}$" insert -- $E_\Sigma$ -- line 25 - delete "$\emptyset$" (both occurrences) insert -- $\theta$ -- line 62 - delete "$Q^t$" insert -- $Q^t*$ --

Column 5, lines 50-51 - delete "($T_{11} = T_{22} = \cos \emptyset$, $T_{12} = '\sin \emptyset$, $-T_{12} = \sin \emptyset$" insert -- ($T_{11} = T_{22} = \cos \theta$, $-T12 = -\sin \theta$, $T_{12} = \sin \theta$

UNITED STATES PATENT AND TRADEMARK OFFICE
CERTIFICATE OF CORRECTION

PATENT NO. : 4,087,818
DATED : May 2, 1978
INVENTOR(S) : Randall William KREUTEL, Jr.

It is certified that error appears in the above-identified patent and that said Letters Patent are hereby corrected as shown below:

Column 6, line 15 - delete "out" insert -- our --

Column 7, line 38 - delete "b = S = a" insert -- $\bar{b} = S = \bar{a}$ -- line 40 - delete "a and b" insert -- $\bar{a}$ and $\bar{b}$ --

Column 9, line 34 - delete "∅" insert -- θ --

Signed and Sealed this

Third Day of October 1978

[SEAL]

Attest:

RUTH C. MASON
*Attesting Officer*

DONALD W. BANNER
*Commissioner of Patents and Trademarks*